United States Patent [19]

Wilfinger et al.

[11] Patent Number: 4,717,424

[45] Date of Patent: Jan. 5, 1988

[54] METAL PIGMENTS STABILIZED WITH CARBOXY-ALKYLENE PHOSPHORIC ACID ESTER OR CARBOXY-ALKYLENE PHOSPHONIC OR PHOSPHINIC ACID

[75] Inventors: Werner Wilfinger, Graz; Maximilian Friedl, Gratkorn, both of Austria

[73] Assignee: Vianova Kunstharz, A.G., Werndorf, Austria

[21] Appl. No.: 877,002

[22] Filed: Jun. 20, 1986

[30] Foreign Application Priority Data

Jun. 20, 1985 [AT] Austria ................................ 1829/85

[51] Int. Cl.$^4$ .......................... C09C 1/62; C09D 5/38; C09D 7/12
[52] U.S. Cl. ............................. 106/308 Q; 106/286.5
[58] Field of Search ......................... 106/308 Q, 286.5

[56] References Cited

U.S. PATENT DOCUMENTS 4,042,324 8/1977 Anel et al. ............................ 252/82
4,138,270 2/1979 Ishijima et al. ...................... 106/291
4,280,960 7/1981 Nonn et al. ...................... 106/288 Q
4,419,134 12/1983 Ishijima et al. ........................ 106/87
4,453,982 6/1984 Wilfinger et al. .............. 106/308 M
4,501,615 2/1985 Reeder et al. ..................... 106/14.39
4,505,748 3/1985 Baxter ............................... 106/14.39
4,565,716 1/1986 Williams et al. ..................... 427/216
4,621,112 11/1986 Backhouse et al. ................. 106/290

FOREIGN PATENT DOCUMENTS 1423495 2/1976 United Kingdom .

Primary Examiner—A. Lionel Clingman
Attorney, Agent, or Firm—A. W. Breiner

[57] ABSTRACT

The invention is concerned with stabilized metal pigments, in particular aluminum pigments, particularly against water and moisture, with improved resistance characteristics in aqueous paints. The stabilization of the metal particles is carried out through treatment with carboxyalkylene phosphoric acid esters, and/or carboxyalkylene phosphonic acids, and/or carboxyalkylene phosphinic acids. The carboxylic group of the compounds can be at least partially neutralized if desired.

21 Claims, No Drawings

METAL PIGMENTS STABILIZED WITH CARBOXY-ALKYLENE PHOSPHORIC ACID ESTER OR CARBOXY-ALKYLENE PHOSPHONIC OR PHOSPHINIC ACID

FIELD OF INVENTION

This invention is directed to metal pigments which are stabilized against chemical influences, particularly against water and moisture. More particularly, the invention is directed to a process of stabilizing metal pigments, such as aluminum pigments; to the metal pigments obtained, and to the use of the stabilized metal pigments of the invention, such as the stabilized aluminum pigments, in aqueous paints.

BACKGROUND OF INVENTION

The so-called "metallic enamels" are enjoying rising popularity, particularly in industrial coating, especially in the automobile industry. In the preparation of metallic enamels in most cases aluminum powders of different fineness and surface treatment are used with the metal particles always having a flaky structure in order to achieve the desired effect. This tendency to use "metallic enamels" is counteracted due to the polluting effect of such paints because of the substantially higher level of solvents needed for such paints as compared to paints which do not have this metallic effect.

Further, a difficulty connected with the use of non-precious metal pigments in aqueous paints is that the fine metal particles react with water with the formation of hydrogen. On the one hand, through this reaction, the desired optical effect is either reduced or destroyed; and, on the other hand, the developing hydrogen gas can lead to the explosion of the paint containers.

Many attempts have been made to overcome the difficulties surrounding the use of aluminum pigments in an aqueous paint. For example, the producers of pigments offer special aluminum pigment pastes. *Alcoa Pigments Technical Data,* Report No. 100, July 1975, discloses in an article entitled "Aluminum Hydro-Pastes Promise Industry-Wide Impact" a new technology where the aluminum pigment, in addition to a wetting agent, contains a volatile corrosion inhibitor. Similar methods of treatment with water-repellent substances are recommended by others. U.S. Pat. No. 3,926,874 uses polyamides, fatty amides, or fluoro and silicone containing wetting agents with specific surface tensions. According to U.S. Pat. No. 3,839,254, perfluoroalkyl wetting agents are used; while U.S. Pat. No. 4,138,270 uses fatty acids or fatty acid alkanol amides in combination with nonionic wetting agents. A similar method is described in EP-A2-01 33 643.

All such methods do not provide a sufficiently durable protection for the metal pigment in the paint. It can be assumed that the additives, due to their poor adhesion to an aluminum surface, are peeled off or removed from the metal surface by organic solvents also present in aqueous paints, or by the amines and the paint binders. Furthermore, the hydrophobic character of the coating agents leads to wetting problems and possibly to a flocculation of the pigments unless sufficient quantities of emulsifiers are used. When emulsifiers are used, however, the resistance characteristics of the paint films are adversely influenced.

Another method to protect metal pigments from water consists in the coating of the pigment particles with crosslinked polymers. U.S. Pat. No. 3,616,397, for example, describes a method of coating the pigment particles with a thin coat of a crosslinked polymer by polymerization of acrylic monomers in the presence of the pigment. The polymerization is carried out in an organic solvent from which the coated pigment is separated by filtration. A disadvantage of this method is that several steps are necessary for the production of such special pigments, rendering the method uneconomical. Furthermore, there is a danger of damaging the very thin protective layer during the course of the production or the transport of the paint, i.e., with conventional cogwheel pumps in circular ducts, which will reduce the anticorrosive effect.

The same negative effects are realized according to the method disclosed by DE-AS No. 24 32 796 wherein the metal pigments are protected from atmospherical influences through a polymerization reaction with vinyl monomers. Although the adhesion of the protective coat to the previously activated surface of the pigment particles can be enhanced through the coemployment of phosphoric acid containing monomers, there still remains the disadvantage of the uneconomical production of the pigment preparations and the sensitivity of the protective layer to mechanical impact.

In order to avoid the aforesaid described disadvantages, AT-PS No. 372 696 corresponding to U.S. Pat. No. 4,453,982 discloses a method of stabilizing metal pigments from corroding media, particularly in anionic aqueous paints, by coating the pigment particles with a reaction product of an amino-formaldehyde condensate etherified with low molecular weight alcohols and phosphoric acid derivatives. However, it has been shown that paints containing the thus-coated metal pigments have to have higher pH-values to avoid flocculation, which in turn increases the aggressivity of the aqueous medium on the metal pigment to such an extent that the protective coating is ruptured and the aluminum pigment is slowly destroyed.

Another type of coating is described in DE-OS No. 30 20 073 corresponding to U.S. Pat. No. 4,419,134 according to which water-dispersible paste compositions of metal powders are obtained, if the coating materials are organic phosphoric acid esters of long-chain alcohols. These materials fixedly link with the metal, whereby the danger of separation or displacement by the binder is precluded.

EP-A1-01 33 644 corresponding to U.S. Pat. No. 4,565,716 discloses a similar method for stabilizing metal pigments by amine-neutralized phosphoric acid esters of alkyl phenols. Both such methods, however, have the disadvantage that in the aqueous medium the hydrophobic molecule segment leads to agglomeration of the pigment and, thus, to an unsightly metallic effect, unless corresponding quantities of emulsifiers are used in addition which in turn lead to other defects of the film.

SUMMARY AND GENERAL DESCRIPTION OF INVENTION

It has now been found that it is possible to stabilize metal pigments against corroding influences, particularly against water, including when incorporated into aqueous paints, if carboxy group containing phosphoric acid derivatives are used as stabilizers. Thus, the invention in one embodiment is concerned with metal pigments, in particular aluminum pigments, stabilized against chemical influences, particularly against water and moisture, by means of phosphoric acid derivatives, characterized in that the surfaces of the pigments are treated with a carboxy alkylene phosphoric acid ester of formula (I)

and/or carboxy alkylene phosphonic acid (where $R_1$ is hydroxyl) and/or carboxy alkylene phosphinic acid (where $R_1$ is hydrogen) of formula (II)

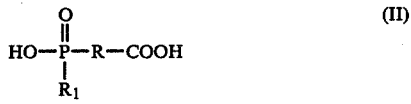

wherein R is a straight chain or branched, optionally halogen substituted alkylene radical with 2 to 17 C-atoms and $R_1$ is a hydroxy group or a hydrogen atom, or the partially neutralized compounds thereof.

The invention in another embodiment is concerned with a process for stabilizing metal pigments, in particular aluminum pigments, by means of phosphoric acid derivatives, characterized in that the metal pigment is treated, optionally in the presence of a wetting agent and/or organic solvents and/or water, with a carboxy alkylene phosphoric acid ester of formula (I)

and/or carboxy alkylene phosphonic acid and/or carboxy alkylene phosphinic acid of formula (II)

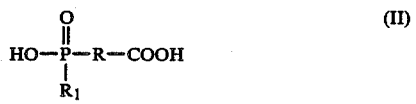

wherein R is a straight chain or branched, optionally halogen substituted alkylene radical with 2 to 17 C-atoms and $R_1$ is a hydroxy group (phosphonic derivative) or a hydrogen atom (phosphinic derivative), or partially neutralized compounds thereof, and that subsequently the thus-treated pigment is allowed to mature for at least 12 hours at room temperature.

Furthermore, as still another embodiment the invention is concerned with the use of the metal pigments stabilized according to the invention, particularly stabilized aluminum pigments, in aqueous paints.

In comparison with known pigment products, the metal pigment pastes produced according to the invention have the special advantage that aqueous paints pigmented therewith do not decompose, even at a pH-value of 9 and above. Contrary to the resinlike coating materials of the prior art, the products used according to the present invention for stabilization require only low levels, i.e., about 0.5 to 10% by weight (b.w.) based on the metal pigment to guarantee a durable protection. Since normally no wetting or emulsifying agents are necessary, the disadvantage connected with such additives, such as reduced water and weather resistance, are avoided.

The carboxy alkane compounds of phosphor of formula (II) suitable for use according to the present invention are disclosed, for example, in DE-OS No. 25 05 435 corresponding to British Pat. No. 1,423,495. According to the disclosure, the compounds are used as corrosion inhibiting substances in water ducts such as cooling water conduits. The preparation of the corresponding phosphonic compounds can be carried out according to BE-PS No. 816,947 corresponding to British Pat. No. 1,423,495.

The carboxy-alkyl phosphoric acid esters according to formula (I) particularly suitable for the present invention, and moreover inexpensive, are obtained through esterification of hydroxy carboxylic acids with phosphoric acid or poly-phosphoric acid or phosphor pentoxide. With polyphosphoric acid and phosphor pentoxide, the reaction is carried out in the presence of water. Examples of such hydroxy carboxylic acids are 3-oxypropionic acid, gamma-oxybutyric acid as well as, preferably, long chain hydroxycarboxylic acids, such as epsilon-hydroxy capronic acid or 12-hydroxy stearic acid. The lactones of gamma-, delta-, or epsilon-hydroxy capronic acids are particularly suited for the preparation of the carboxyalkyl-phosphoric acid esters according to formula (I). The phosphoric acid ester of epsilon-hydroxy capronic acid is particularly preferred for the present invention and can be easily produced from epsilon-caprolactone and phosphoric acid. Optionally, hydroxycarboxylic acids, the alkylene radical of which is substituted with a halogen, can also be used.

The stabilizers are either used as the acids or after partial or total neutralization with alkali hydroxides, ammonium hydroxide or, preferably, amines, such as triethylamine, dimethylaminoethanol, triethanolamine, or similar substances. The stabilization can either be carried out during the production of the metal pigments or by the treatment of available metal pigment pastes such as aluminum pigment pastes.

The quantity of the added stabilizer ranges between 0.1 and about 10% b.w., calculated on the metal content of the pigment paste. Preferably, 1 to 5% b.w. are used. Quantities below 0.1% b.w. are not sufficient to obtain the desired effect, while quantities of over 10% b.w. demonstrate no further improvement, but may eventually adversely influence the paint properties. The optimum level of the stabilizer depends on the type of the metal pigments, such as the aluminum pigments, (particle size, degree of purity) and the paint (pH-value, type of binder, solvent content, etc.).

The stabilizer is employed by mixing it with the metal pigment, together with the optionally used wetting agents and solvents. Prior to the use of the stabilized pigment it preferably is allowed to mature for at least 12 hours at room temperature. The process of the invention allows the aluminum pigments widely used by industry to be stabilized for their use in aqueous paints. With other metal pigments, such as those based on zinc, magnesium, copper, steel (iron), bronze, and brass, the enhanced effect will vary on an individual basis. The stabilized pigment pastes are further processed in normal manner by stirring them into the other paint ingredients, other colored pigments being able to be coemployed to achieve special effects. The pigment pastes of the invention can be used in all nonionic or anionic water-soluble or water-dilutable paints.

The following examples illustrate the invention without limiting its scope. Parts and percentages are by weight unless otherwise stated.

PREPARATION OF THE STABILIZERS (A) 114 parts epsilon-caprolactone are charged to a reaction vessel equipped with stirrer, thermometer, water separator and cooler, and 116 parts of an 85% aqueous solution of o-phosphoric acid (1 mole $H_3PO_4$) are added at a rate considering the exotherm. When the exotherm has subsided, the mass is heated to 200° C., 18 parts of water distilling off. The clear, light brown mass has an acid value of 650 mg KOH/g.

(B) In a reaction vessel as described under (A), 300 parts 12-hydroxy stearic acid (1 mole) are heated at 80° C. to the molten state, and after addition of 116 parts of an 85% aqueous solution of o-phosphoric acid are heated to 200° C. At this temperature, 36 parts water distill off azeotropically using toluene as an entraining agent. A brown pasty mass remains which has an acid value of 365 mg KOH/g.

(C) 86 parts gamma-butyrolactone (1 mole) are charged to a reaction vessel as described under (A) and, considering the exotherm, 116 parts o-phosphoric acid (85% in water) are added. After the exotherm has subsided, 18 parts water are distilled off at 200° C. The dark brown, clear mass has an acid value of 250 mg KOH/g.

(D) 2-carboxyethane phosphonic acid which is commercially available, or can be prepared according to BE-PS No. 816,947.

Preparation of the Aluminum Pigment Dispersions

Various dispersions of aluminum pigments listed in Table 1 (Examples 1–7) were prepared with the following pigments:

MP I

A commercially available aluminum paste with a range of fineness between 10 μm and 30 μm; nonleafing type; metal content 65%, solvent content (including fats and additives) 35%, solvent: white spirit/aromatic hydrocarbons; average particle size (DIN 4190): 22 μm.

MP II

A commercially available special aluminum paste for aqueous paints; 65% metal content. The pigment paste contains a corrosion inhibitor and otherwise is the same as MP I regarding particle size distribution, etc.

TABLE 1

| Ex. | Aluminum-Pigment Parts | Solvent Parts | Stabilizer Parts | % on Metal |
|---|---|---|---|---|
| 1 | 100 I | 26 BDG 87.45 ET | 3.25 (A) | 5% |
| 2 | 100 II | 26 BDG 89.4 ET | 1.30 (A) | 2% |
| 3 | 100 I | 26 BDG 89.4 ET | 1.30 (B) | 2% |
| 4 | 100 I | 26 BDG 89.4 ET | 1.30 (C) | 2% |
| 5 | 100 I | 26 BDG 89.4 ET | 1.30 (D) | 2% |
| 6(V) | 100 I | 26 BDG 90.7 ET | — | — |
| 7(V) | 100 II | 26 BDG 90.7 ET | — | — |

(V) = Comparison Example
BDG = Diethyleneglycolmonobutylether
ET = Ethanol

Comparison Of the Pigment Pastes Prepared According To Examples 1–7 (Examples 6 and 7 Are Comparison Examples)

In the test paint compositions, the symbols have meanings as follows:

AC

A commercially available water-soluble acrylic copolymer with 50% solids content; solvent BDG; recommended by the producer as a binder in combination with the acrylic copolymer dispersion AD as medium for pigmentation.

AD

A commercially available aqueous acrylic copolymer dispersion; recommended by the producer for combination with the water-soluble acrylic copolymer AC; 50% solids content.

HMMM

Hexamethoxymethylmelamine p-TSS p-toluolsulfonic acid, 33%, neutralized with dimethylethanolamine, consisting of 36.40 parts by weight p-toluolsulfonic acid, 46.55 parts by weight water, and 17.05 parts by weight dimethylethanolamine.

The test paints have the following composition:

|  | Parts |
|---|---|
| AC (50%) | 20.0 |
| Pigment Paste | 28.3 |
| HMMM | 10.0 |
| p-TSS | 1.2 |
| NH$_3$-Solution (10%) | 5.0 |
| Water, Deionized | 15.0 |
| AD (50%) | 40.0 |
| Total | 119.5 |

The paints are prepared by dispersing the aluminum pastes of Examples 1–7 in the acrylic copolymer AC. Then the amine resin (HMMM), the neutralized acid catalyst (p-TSS), and the neutralising agent aqueous ammonia solution, 10% b.w. NH3) are added. After dilution with water, the paint is completed with the addition of the acrylic copolymer dispersion (AD).

The paints are adjusted to a pH-value of from 8.5 to 9.0 with aqueous ammonia solution, diluted with deionized water to a viscosity of 20 s/DIN 53 211/20° C., and sprayed on cleaned steel panels. After a flash-off of 10 minutes, the films are stoved for 30 minutes at 150° C. The dry film thickness is 30–35 μm. The pendulum hardness of the films is tested according to DIN 53 157. In all cases it was 140±5 seconds. The effect of the stabilizers of the invention is evaluated upon application of the paint and after different times of storage of the paint.

A: 1st application . . . 2 hours after preparation
B: 2nd application . . . 24 hours after preparation
C: 3rd application . . . 21 days after preparation
D: 4th application . . . 21 days after preparation
A–C: storage at room temperature
D: storage at 40° C.

The evaluation was made according to the following criteria:
SH: very light
H: light
LV: slightly greyed
SSV: strongly greyed
Z: metal pigment destroyed The following results were obtained:

| Storage | 1 | 2 | 3 | 4 | 5 | 6(V) | 7(V) |
|---------|----|----|----|----|----|------|------|
| A | SH | SH | H | SH | SH | H | H |
| B | SH | SH | H | SH | H | LV | H |
| C | SH | SH | H | H | H | SSV | LV |
| D | H | SH | H | H | H | Z | LV |

As shown by the comparison, the paint compositions of the present invention have greatly improved properties.

As will be apparent to one skilled in the art, various modifications can be made within the scope of the aforesaid description. Such modifications being within the ability of one skilled in the art form a part of the present invention and are embraced by the appended claims.

It is claimed:

1. Metal pigments stabilized against water and moisture, said pigments having their surfaces treated with a carboxy alkylene phosphoric acid ester of formula (I)

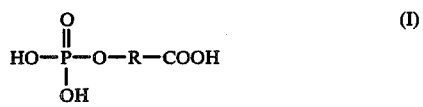

or a carboxy alkylene phosphonic acid or carboxy alkylene phosphinic acid of formula (II)

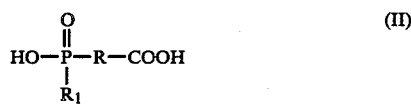

wherein R is a substitutes or insubstituted straight chain or branched chain alkylene radical with 2 to 17 C-atoms and $R_1$ is a hydroxy group or a hydrogen atom.

2. The metal pigments of claim 1 wherein the carboxy group is at least partially neutralized.

3. The metal pigments of claim 1 wherein the said pigments have their surfaces treated with a carboxy alkylene phosphoric acid ester of formula (I).

4. The metal pigments of claim 1 wherein the said pigments have their surfaces treated with a carboxy alkylene phosphonic acid of formula (II).

5. The metal pigments of claim 1 wherein the said pigments have their surfaces treated with a carboxy alkylene phosphinic acid of formula (II).

6. The metal pigments of claim 1 wherein R is substituted with halogen.

7. The metal pigments of claim 1 wherein the metal pigments are aluminum pigments.

8. The metal pigments of claim 7 wherein the said pigments have their surfaces treated with a carboxy alkylene phosphoric acid ester of formula (I).

9. The metal pigments of claim 8 wherein the phosphoric acid ester of formula (I) is a reaction product of gamma-, delta-, or epsilon-caprolactones with o-phosphoric acid, polyphosphoric acid, or phosphorpentoxide.

10. The metal pigments of claim 9 wherein in the phosphoric acid ester of formula (I) R is —CHOH(CH$_2$)$_4$— to provide the phosphoric acid ester of epsilon-hydroxycapronic acid.

11. Process for stabilizing metal pigments against water and moisture comprising treating the metal pigments with a carboxy alkylene phosphoric acid ester of formula (I)

or a carboxy alkylene phosphonic acid or carboxy alkylene phosphinic acid of formula (II)

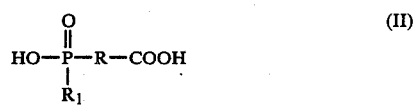

wherein R is a substituted or unsubstituted straight chain or branched chain alkylene radical with from 2 to 17 C-atoms and $R_1$ is a hydroxy group or a hydrogen atom.

12. The process of claim 11 wherein said carboxy group is at least partially neutralized.

13. The process of claim 11 wherein said treatment is carried out in the presence of an organic solvent or water.

14. The process of claim 13 wherein said treatment is carried out in the presence of an organic solvent or water and a wetting agent.

15. The process of claim 11 characterized in that a compound of formula (I) is used and the carboxy alkylene phosphoric acid ester of formula (I) is a reaction product of gamma-, delta-, or epsilon-caprolactones with o-phosphoric acid, polyphosphoric acid, or phosphorpentoxide.

16. The process of claim 15 wherein said reaction product is produced in the presence of water.

17. The process of claim 15 characterized in that in the compound of formula (I) R is —CHOH(CH$_2$)$_4$— to provide the phosphoric acid ester of epsilon-hydroxycapronic acid.

18. The process of claim 11 characterized in that about 0.1 to 10% by weight, calculated on metal pigment, of the stabilizer is used.

19. The process of claim 18 wherein the metal pigment is an aluminum pigment.

20. The process of claim 19 characterized in that the aluminum pigment, prior to the preparation of the paint, is mixed with the stabilizer for at least 30 minutes and afterwards is allowed to mature for at least 12 hours before use in the paint.

21. Aqueous paints comprising stabilized metal pigments according to claim 7.

* * * * *